Oct. 28, 1924.

W. P. FLEMING

CURTAIN MUD GUARD FOR AUTOMOBILES

Filed Feb. 25, 1924

1,513,167

INVENTOR
Walter P Fleming
By Myron J Dikeman
ATTORNEY

Patented Oct. 28, 1924.

1,513,167

UNITED STATES PATENT OFFICE.

WALTER P. FLEMING, OF HIGHLAND PARK, MICHIGAN.

CURTAIN MUD GUARD FOR AUTOMOBILES.

Application filed February 25, 1924. Serial No. 694,875.

*To all whom it may concern:*

Be it known that I, WALTER P. FLEMING, a citizen of the United States of America, residing in the city of Highland Park, county of Wayne, State of Michigan, have invented certain new and useful Improvements in a Curtain Mud Guard for Automobiles, and declare the following to be a full, clear, and exact description of the same, such as will enable others skilled in the art to which it pertains to make and use the same, reference being had to the accompanying drawings, which form a part of these specifications.

The object of my invention is to provide a detachable mud guard for the rear wheel of an automobile, which may be easily and conveniently attached to the wheel fender, and for preventing the rear auto wheel from throwing mud on the following car being towed behind.

It is now the common practice among automobile dealers at the present time, to move several cars in transit from one place to another, by attaching one car behind another by use of a tow-away device, allowing the several cars to be moved with only one driver in the forward car, the cars being attached very close together. The objection of moving new cars in this manner is because of the forward car throwing mud from its rear wheel on the following car. My invention is for the purpose of protecting the towed car from being damaged by this means.

Another object is to provide a temporary mud guard for the rear wheel which can be attached quickly and easily, without drilling extra holes in the fender or marring the surface in any manner.

A further object is to provide a mud guard that can be easily shifted from one car to another.

A still further object is to produce an extension mud guard that can be easily and efficiently operated, can be used on any make car, and can be manufactured at a very low cost.

These several objects are attained in the preferred form by the construction and arrangement of parts more fully hereinafter set forth.

Similar parts on all drawings are marked by similar numerals.

Figures 1, 2, 3:
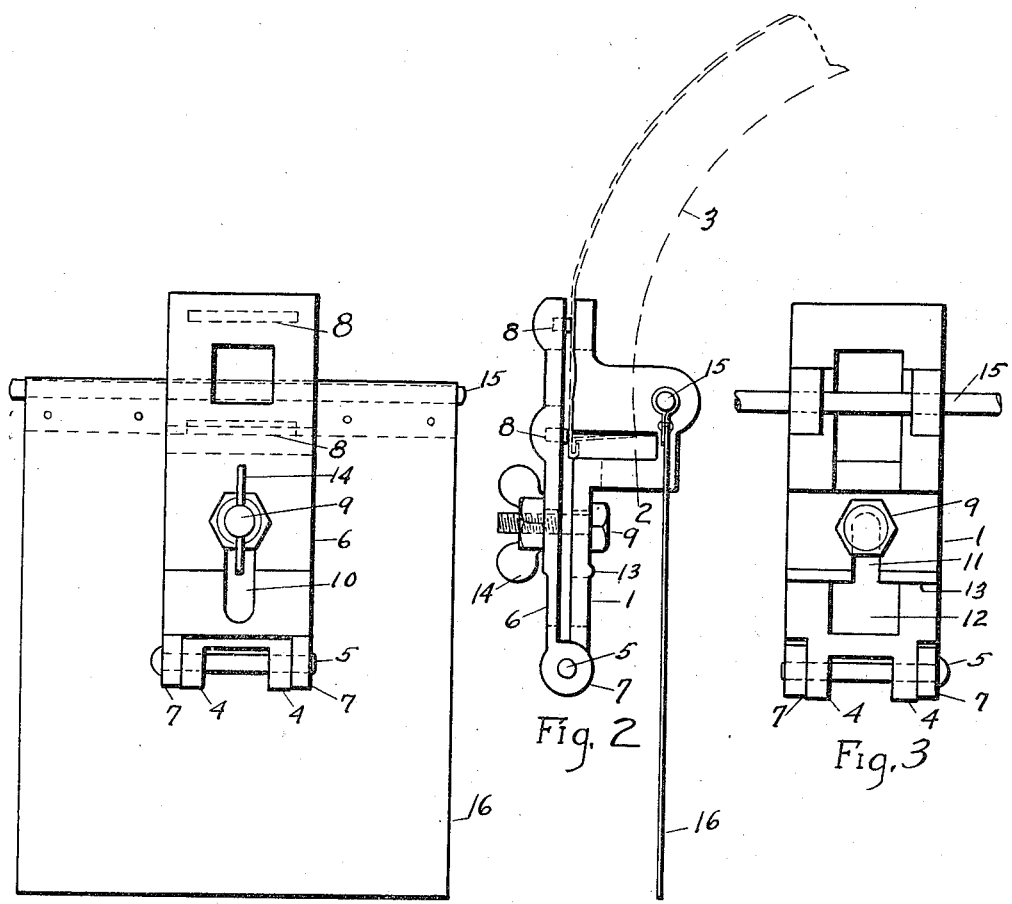
Fig. 1, shows a front view of the mud guard as it is suspended from the guard clip.
Fig. 2, is a side view of the guard clip and suspended mud curtain, and means for attaching the clip to the end of the automobile fender.
Fig. 3, is a back view of the guard clip showing the general construction and means for opening the clip.
Figure 4:
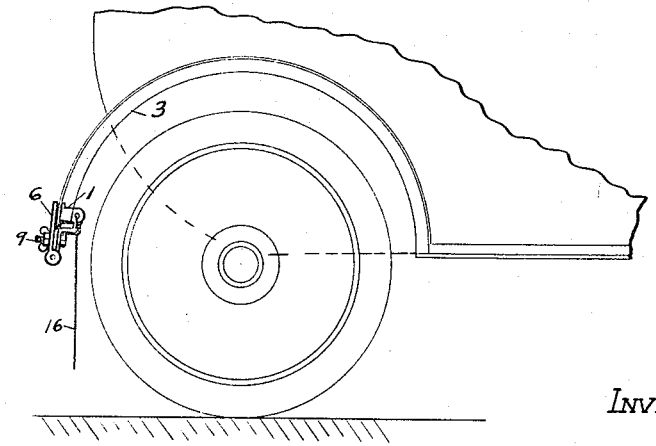
Fig. 4, is a general view of the mud guard as attached to an automobile.

I will now describe more fully the detailed construction of my curtain mud guard, referring to the drawings and the marks thereon.

The general construction of my mud guard consists of a detachable clamping frame, or guard clip, suitable for engaging and retaining therein the end of the rear fender of an automobile, by clamping over the flange of the fender. The cap of the clamping frame is provided with surface cushions, and is hinged to the clip frame at one end and held in place by means of a lock bolt passing through both sections of the clip, clamping them firmly together. From a support rod mounted in the clip frame, is suspended the guard curtain.

The guard clip comprises a clip frame —1—, made of suitable metal for forming castings, and is formed into an elongated rectangular bar frame with a U-shaped socket —2— provided therein and extending across the face of the frame near the central position thereof, to receive and retain therein the ribbon, or flange of the automobile wheel fender. The U-socket may be varied in size and shape as required to fit the various make fenders used on automobiles. The upper end of the frame is extended beyond the U-socket, and shaped to fit the under surface of the fender crown —3— to which it is attached. The lower end of the clip frame —1— is provided with hinge blocks —4— and carries a hinge pin —5— mounted therein. A cap plate —6— also provided with hinge blocks —7— at one end thereof, is hinged to the clip frame —1— on the hinge pin —5—, and is free to swing thereon for closing the cap down on the clip frame. The cap plate —6— is also rectangular in shape, coinciding with the face of the clip frame —1— when both are closed together. On the cap plate —6—, near the outer end thereof, are imbedded two surface cushions —8—, made of felt, or rubber, and are securely attached to the cap by forcing same within the retaining sockets cast in the cover plate. The surface cushions are provided to prevent the guard clip from marring the surface of the automobile fender when attached to new cars. Through the walls of both the cap plate and the clip frame, near the hinged end thereof, is a slotted recess for the lock bolt —9—. The cap plate —6— having a straight elongated slot —10— extending lengthwise of the bar, and near the hinged end thereof, and of a size to allow the lock bolt —9— to pass through as it is adjusted from one end to the other of the slot. While the clip frame is provided with the slot —11— which coincides with the slot —10— when the cap is closed down on the frame, the lower half of the opening in the clip frame being enlarged near the hinged end thereof, forming a rectangular opening —12— of a size to allow the head of the lock bolt —9— to pass through. Between the openings —11— and —12— is a rib —13— passing across the face of the clip frame —1—, for the purpose of holding the lock bolt —9— in position when the cap and frame are clamped together. In opening the guard clip it is only necessary to loosen the wing nut —14— on the bolt —9—, which allows the bolt to be moved in the slotted recess, bringing the bolt head over the enlarged opening —12—, then the bolt —9— may be drawn through the opening and the cap plate turned back on the hinge pivot —5—, allowing the guard clip to be removed from the fender. Through the outer end of the —U— socket —2— is mounted a guard rod —15—, which passes through the casting and is extended on either side thereof, being held in place by a tight fit, or by a set screw in the casting. To the rod —15— is attached the mud curtain —16—, made of leather, or any flexible material. The curtain —16— is rectangular in form, having a looped end therein for receiving the rod —15—, and is notched in the center to allow the curtain to pass over the clip frame casting. The curtain —16— is of a width to extend over both sides of the wheel tire, and of a length to reach near the ground when the guard clip is attached to the end of the wheel fender.

In using my curtain mud guard, the guard clip is securely attached to the end of the rear wheel fender by placing the —U— socket —2— over the end fender flange and closing the hinged cap plate —6— down on the outer surface of the fender crown. The lock bolt —9— being slid in place in the slots —10— and —11— and the winged nut —14— securely tightened, thus bringing the mud curtain in position directly behind the rear wheel, preventing any mud from being thrown on the trailed automobile while in transit.

Having fully described my curtain mud guard what I claim as my invention and desire to secure by Letters Patent is;

1. A curtain mud guard for the rear wheel of an automobile, comprising a U-socket clip frame to fit over and engage the inner flange of the automobile wheel fender, a cap plate hinged to the end of the U-socket clip frame, means for clamping said cap plate to the U-socket frame for securely gripping the fender walls, a guard rod mounted in the socket frame and extending beyond the sides thereof, a flexible mud curtain suspended from the guard rod in such a position as to hang directly behind the auto wheel.

2. A curtain mud guard adapted to the rear wheel of an automobile, comprising a U-socket frame to fit and engage the inner flange of the rear fender of the automobile, a cap plate hinged to one end of the U-socket frame, surface cushions mounted within the said cap plate and projecting beyond the inner surface thereof, and so positioned as to engage the outer surface of the auto fender when the cap is closed on the frame, a lock bolt passing through the walls of both cap plate and frame, means for clamping both cap and frame securely on the fender, slotted openings in the frame casting to allow the bolt head to pass through when the cap plate is turned on the supporting hinge, a guard rod mounted in the clip frame and projecting from both sides of said frame, a flexible mud curtain suspended from the said guard rod.

In witness whereof I sign these specifications.

WALTER P. FLEMING.